Jan. 21, 1964  R. T. ROBINETTE ETAL  3,118,521
VENTILATED BRAKE

Filed July 17, 1962  2 Sheets-Sheet 1

INVENTORS.
Richard T. Robinette
Harvey C. Swift
BY
Barnes, Dickey & Pierce
ATTORNEYS

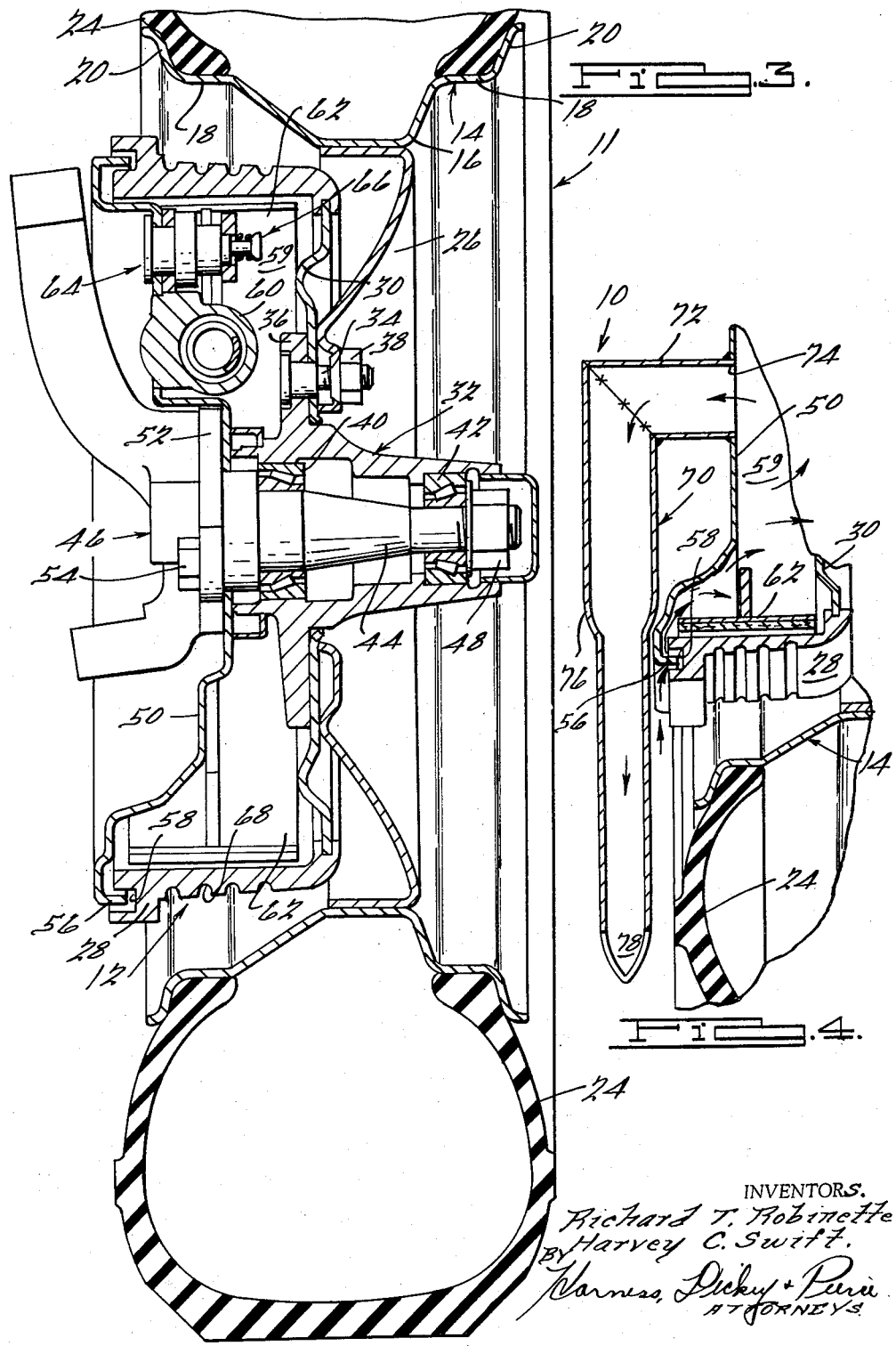

ns Jan. 21, 1964

3,118,521
VENTILATED BRAKE
Richard T. Robinette, St. Clair Shores, and Harvey C. Swift, Birmingham, Mich., assignors to Kelsey-Hayes Company, Romulus, Mich., a corporation of Delaware
Filed July 17, 1962, Ser. No. 210,331
6 Claims. (Cl. 188—264)

This invention relates to brake assemblies and more particularly to means for ventilating the braking elements of such assemblies.

The primary object of the present invention is to improve brake ventilating means by conjointly passing translational and rotational air streams relative to an outlet opening in a tubular element for producing a suction effect therein which will circulate air internally of a brake assembly.

A further object of the invention is to improve such brake ventilating means by locating the outlet opening in such a suction-inducing tubular element adjacent a wheel assembly operatively associated with the brake assembly so that rotational and translational air streams produced by rotation of the wheel assembly will rush past the opening to produce an improved suction effect within the tubular element.

A still further object of the invention is to provide an economical, compact brake ventilating system which is quickly assembled and extremely effective in dissipating heat from braking elements.

Further objects, features and advantages of this invention will become apparent from a consideration of the following description, the appended claims and the accompanying drawings in which:

FIGURE 3 is an enlarged view in vertical section taken along the line 3—3 of FIGURE 1 looking in the direction of the arrows; and FIGURE 4 is an enlarged view in oblique section taken along the line 4—4 of FIGURE 1 looking in the direction of the arrows.

Figure 1:
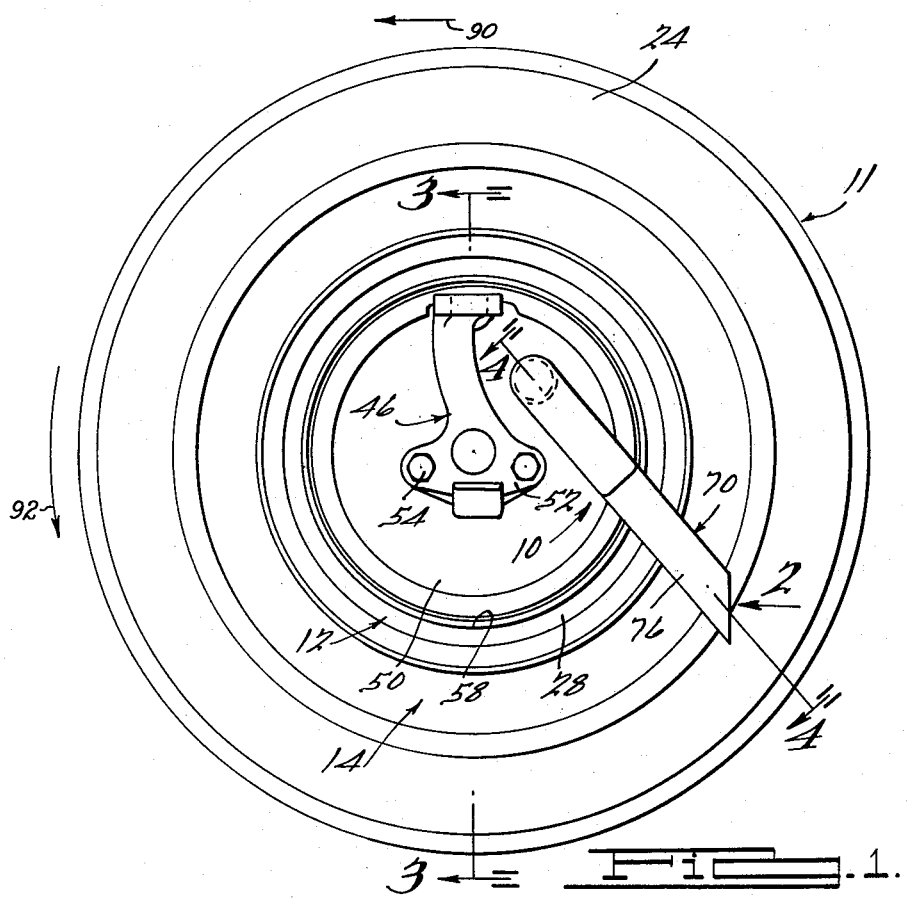
FIGURE 1 is a side elevational view of a wheel and brake drum assembly including a brake ventilating device constructed in accordance with the principles of the present invention.
Figure 2:
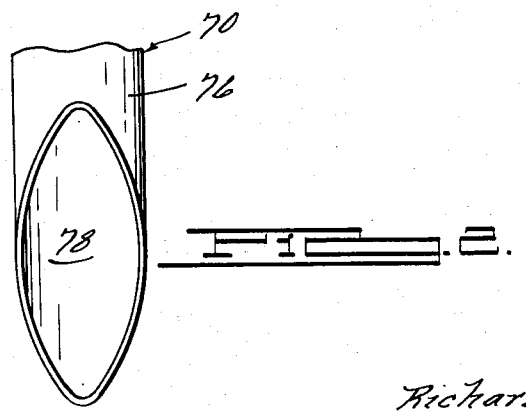
FIGURE 2 is an enlarged detail view of a portion of the ventilating device looking in the direction of the arrow 2 in FIGURE 1.

Referring now to the drawings, one embodiment of the invention is illustrated as comprising a suction-inducing structure 10 which is operatively associated with a wheel assembly 11 and a brake assembly 12.

More particularly, the wheel assembly 11 is representatively illustrated as including a wheel rim 14 which includes a drop center portion 16, tire bead seats 18 and spaced tire-retaining flanges 20 directed radially outwardly of the wheel rim for supporting a conventional inflatable tire structure 24.

The wheel assembly 11 further includes a central disc or spider 26 which has the radially outer surface thereof connected to the inner periphery of the drop center portion 16 by suitable fastening means such as welding or the like.

The brake assembly 12 which is operatively associated with the wheel assembly 11 is representatively illustrated as comprising a brake drum 28 which is supported by means of a radially inwardly directed web portion 30 with respect to a conventional wheel hub assembly 32.

Suitable fastening means, such as studs 34, are directed through the wheel disc 26, the web portion 30 of the brake drum and a radially outwardly directed flange 36 of the hub assembly 32 to threadably engage nuts 38 for securing the brake drum and wheel assemblies 11, 12 on the hub assembly 32.

The hub assembly 32 has a pair of spaced roller bearings 40, 42 which are mounted internally at either end thereof for rotatably supporting the wheel assembly 11 and brake drum 28 on an elongated shaft portion 44 of a spindle assembly 46 which is adapted to be connected to a conventional suspension system of an automobile or the like. One end of the shaft 44 is externally threaded to threadably engage with a nut 48 for securing the hub assembly 32 on the wheel mounting spindle 46.

A brake carrier plate 50 of the brake assembly 12 is located inwardly of the brake drum web 30 and has a radially inwardly located edge portion which is secured to a radially outwardly directed flange portion 52 of the wheel mounting spindle 46 by suitable fastening means such as screws 54. The carrier plate 50 further includes a radially outwardly directed edge portion 56 which is turned in a generally axial direction to fit intermediate of a groove 58 defined in the rearwardly directed face of the brake drum 28. The edge 56 and the groove 58 coact to form an annular air inlet passageway at the periphery of the carrier plate 50 which includes reversed paths for preventing water, dust or the like from entering an interior space 59 of the brake assembly 12 as defined by the brake drum 28, the brake drum web 30 and the brake carrier plate 50.

The brake assembly 12 further includes a conventional hydraulic wheel cylinder 60 for expanding brake shoes 62 radially outwardly until the shoe liner material thereon frictionally engages the inner surface of the brake drum 28. Movement of the shoes 62 is guided by means of anchor mounting means 64 and spring-return means 66 of a conventional construction which interconnect the brake carrier plate 50 and the radially inwardly directed web portions of the brake shoes 62.

Such frictional engagement between the brake shoes 62, and the rotatable brake drum 28 produces a substantial increase in their temperatures which will cause excessive brake wear and can substantially reduce the braking efficiency of the brake assembly by causing brake fadeout and the like.

In order to reduce such temperature increases, means are often provided to increase the heat exchange surface of the brake drum. For example, in the illustrated arrangement, the brake drum 28 includes a plurality of circumferential grooves 68 on the outer periphery thereof for increasing the heat exchange surface. In addition to an increased heat exchange surface on the brake drum portion of a brake assembly, it has been found desirable to ventilate the interior space of the brake assembly by means which will circulate air therethrough and across the drum 28 and shoes 62 for reducing the temperatures thereof so as to minimize excessive brake wear and other bad features which are attributable to such increased temperatures.

In accordance with certain of the concepts of the present invention, such ventilation is attained by means of a tubular element 70 which has an inlet end 72 which connects to an upper portion of the brake carrier plate 50 in surrounding relationship with an aperture 74 formed therein. The tubular element 70 further includes a downwardly directed portion 76 having one of its ends connected to the inlet end 72 and an opposite free end cut off to form an outlet opening 78 located at a point radially outwardly of the brake carrier plate 50 and adjacent the tire structure 24. The opening 78 faces in a rearward direction which is opposite to forward movement (indicated by the arrow 90 in FIGURE 1) of the wheel and brake drum assemblies 11 and 12 as caused by a predetermined rotation (indicated by the arrow 92 in FIGURE 1) of the wheel assembly 11.

Accordingly, when the wheel assembly 11 is rotated in a predetermined manner it will cause translational movement of the wheel assembly 11 and brake assembly 12 in a forward direction which causes translational air streams to pass across the outlet opening 78 of the tubular element 70 to produce a first suction effect adjacent to the opening 78 which will cause air to circulate through the opening defined by the edge 56 and groove 58 of the carrier plate 50 and brake drum 28, respectively, and thence around the brake shoes 62, through the opening 74 in the carrier plate 50 and through the tubular element 70 to the low pressure zone adjacent the outlet opening 78 (see arrows in FIGURE 4 indicating direction of air flow).

In addition to the suction-producing effect of the translational air streams discussed above, rotation of the wheel assembly 11 produces a drag effect which traps an air layer on the outer surface of the tire structure 24 which moves in a rotational direction corresponding to the direction of rotation of the wheel assembly 11 (see arrow 92 in FIGURE 1).

The rotational air stream formed by the rotating wheel assembly 11 will coact with the above discussed translational air streams to increase the suction which is present at the outlet opening 78 of the tubular element 70. In other words, the rotational air stream on the outer surface of the tire structure 24 will rush past the outlet opening 78 in close proximity thereto and thereby induce a vacuum in its wake which will supplement that of the above discussed translational air streams to increase the amount of air circulating through the interior space 59 of the brake assembly 12. It has been found that in order to obtain such a supplemental effect from the above mentioned trapped rotational air stream the inside edge of the tube 70 at the opening 78 should be spaced no more than one and one quarter inches from the outer surface of the tire structure 24. A practical minimum spacing is approximately one half inch. At closer spacings tire deformation may cause the outer surface of the tire to contact the tube 70.

It has been found that such conjointly acting rotational and translational air streams will produce the best possible suction effect if the free end of the tubular element 70 is inclined at an angle between 40 and 60 degrees from the horizontal, it being understood that the end thereof connected to the carrier plate 50 may be inclined at any angle required for clearance between the tubular element 70 and the suspension system with which the element 70 is associated. Furthermore, when the tubular element 70 is so arranged, it has been found that it is best to locate the outlet opening 78 thereof in a plane which is substantially vertical. The outlet opening 78 may be located adjacent any portion of the side wall of the tire structure 24 but in the preferred arrangement it is located at a point near to but spaced from the widest point on the tire structure.

It will be understood that the specific construction of the improved ventilated brake which is herein disclosed and described is presented for purposes of explanation and illustration and is not intended to indicate limits of the invention, the scope of which is defined by the following claims.

What is claimed is:

1. A brake ventilating system for circulating air through the interior space of a vehicle brake housing comprising a rotatable wheel assembly, a tire structure on said wheel assembly, a brake carrier plate nonrotatably mounted relative to said wheel assembly and having an opening therein, a tubular element having one end thereof in communication with said opening, said tubular element extending downwardly from said opening in said brake carrier plate at an inclination of 40°–60° from the horizontal and having a rearwardly facing opening at the opposite end thereof located in a substantially vertical plane and approximately within a distance from greater than 0 to 1¼ inches of the widest point on said tire structure, said tire structure producing a rotational air stream in intersecting relationship with said rearwardly facing opening which causes a suction within said tubular element for circulating air through the interior of a brake housing.

2. Apparatus for use with a wheeled vehicle comprising: a brake and wheel assembly having a generally enclosed chamber partially defined by a nonrotatable member, a rotatable tire member generally annularly disposed about said chamber, brake means located within said chamber for braking the tire, and means for circulating air through said enclosed chamber for cooling said brake means during movement of the vehicle in a forward direction comprising a tubular element having one end connected to said nonrotatable member in communication with said chamber, said tubular element extending externally of said chamber and having its opposite end terminating in an opening located horizontally juxtaposed relative to said tire and between the inner and outer diameters of said tire and within the slip stream created by said tire when it is rotated and located within the translational air stream produced by forward movement of the vehicle.

3. Apparatus for use with a wheeled vehicle comprising: a brake and wheel assembly having a generally enclosed chamber partially defined by a nonrotatable member, a rotatable tire member generally annularly disposed about said chamber, brake means located within said chamber for braking the tire, and means for circulating air through said enclosed chamber for cooling said brake means during movement of the vehicle in a forward direction comprising a tubular element having one end connected to said nonrotatable member in communication with said chamber, said tubular element extending externally of said chamber and having its opposite end terminating in an opening located horizontally juxtaposed relative to said tire and between the inner and outer diameters of said tire and within the slip stream created by said tire when it is rotated and located within the translational air stream produced by forward movement of the vehicle, said opening facing away from the direction of the translational air stream produced by forward movement of the vehicle and away from the direction of the slip stream of said tire.

4. Apparatus for use with a wheeled vehicle comprising: a brake and wheel assembly having a generally enclosed chamber partially defined by a nonrotatable member, a rotatable tire member generally annularly disposed about said chamber, brake means located within said chamber for braking the tire, and means for circulating air through said enclosed chamber for cooling said brake means during movement of the vehicle in a forward direction comprising a tubular element having one end connected to said nonrotatable member in communication with said chamber, said tubular element extending externally of said chamber and having its opposite end terminating in an opening located horizontally juxtaposed relative to said tire and between the inner and outer diameters of said tire and at a point approximately between 40°–60° below the horizontal axis of said brake and wheel assembly, said opening facing away from the direction of the translational air stream produced by forward movement of the vehicle and away from the direction of the slip stream of said tire.

5. Apparatus for use with a wheeled vehicle comprising: a brake and wheel assembly having a generally enclosed chamber partially defined by a nonrotatable member, a rotatable tire member generally annularly disposed about said chamber, brake means located within said chamber for braking the tire, and means for circulating air through said enclosed chamber for cooling said brake means during movement of the vehicle in a forward direction comprising a tubular element having one end connected to said nonrotatable member in communication with said chamber, said tubular element extending externally of said chamber and having its opposite end terminating in an opening located horizontally juxtaposed relative to said tire and between the inner and outer diameters of said tire and approximately within 1¼ inches away from said tire and within the slip stream created by said tire when it is rotated and located within the translational air stream produced by forward movement of the vehicle, said opening facing away from the direction of the translational air stream produced by forward movement of the vehicle and away from the direction of the slip stream of said tire.

6. Apparatus for use with a wheeled vehicle comprising: a brake and wheel assembly having a generally enclosed chamber partially defined by a nonrotatable member, a rotatable tire member generally annularly disposed about said chamber, brake means located within said chamber for braking the tire, and means for circulating air through said enclosed chamber for cooling said brake means during movement of the vehicle in a forward direction comprising a tubular element having one end connected to said nonrotatable member in communication with said chamber, said tubular element having its opposite end terminating in an opening located in juxtaposition relative to said tire and approximately within a distance from greater than 0 to 1¼ inches of said tire and at a point approximately between 40°–60° below the horizontal axis of said brake and wheel assembly, said opposite end terminating in an opening facing away from the forward end of the vehicle and located in a substantially vertical plane.

References Cited in the file of this patent

UNITED STATES PATENTS

| | | |
|---|---|---|
| 2,042,750 | Van Halteren | June 2, 1936 |
| 2,106,702 | Campbell | Feb. 1, 1938 |
| 2,133,597 | Tjaarda | Oct. 18, 1938 |

FOREIGN PATENTS

| | | |
|---|---|---|
| 779,937 | France | Jan. 24, 1935 |